United States Patent
Aggarwal et al.

(10) Patent No.: US 10,477,272 B2
(45) Date of Patent: *Nov. 12, 2019

(54) SOURCE DEVICE DETECTION

(71) Applicant: Caavo Inc, Milpitas, CA (US)

(72) Inventors: Ashish D Aggarwal, Stevenson Ranch, CA (US); Pankaj Kumar Kashyap, Pune (IN); Pankaj Ramesh Chandra Katiyar, Nagpur (IN)

(73) Assignee: Caavo Inc, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,317

(22) Filed: Jun. 29, 2018

(65) Prior Publication Data

US 2018/0310064 A1 Oct. 25, 2018

Related U.S. Application Data

(63) Continuation of application No. 15/398,405, filed on Jan. 4, 2017, now Pat. No. 10,038,936.

(Continued)

(51) Int. Cl.
*H04N 21/442* (2011.01)
*H04N 21/4363* (2011.01)
*G06F 13/40* (2006.01)

(52) U.S. Cl.
CPC ... *H04N 21/44227* (2013.01); *G06F 13/4081* (2013.01); *H04N 21/43635* (2013.01)

(58) Field of Classification Search
CPC ....... H04N 21/44227; H04N 21/43635; H04N 13/4081

(Continued)

(56) References Cited

U.S. PATENT DOCUMENTS

| 8,019,999 B2 | 9/2011 | Candelore |
| 8,526,462 B2 | 9/2013 | Lida |

(Continued)

FOREIGN PATENT DOCUMENTS

| EP | 2385517 A1 | 11/2011 |
| WO | 2013045467 A1 | 4/2013 |
| WO | WO/2016/081624 A1 | 5/2016 |

OTHER PUBLICATIONS

"U.S. Appl. No. 15/641,968, Non-Final Office Action dated Nov. 9, 2017", 15 pages.

(Continued)

*Primary Examiner* — Michael Lee
(74) *Attorney, Agent, or Firm* — Fiala & Weaver P.L.L.C.

(57) ABSTRACT

Methods, systems, and apparatuses are described for source device detection. Source device detection may be performed for a variety of types of connectors such as cables or board/substrate connectors across which a DC voltage or stable presence signal is normally supplied during connections when the power signal of the connector is not present. An alternating power source is coupled to a capacitor of known capacitance via a switch. The capacitor is in series with an effective capacitance of a sink device, a connector, and a source device. When the switch is open, the voltage between the capacitor and the effective capacitor is read to determine if a source device is present and On, and when closed, if the source device is present and Off or in Stand-By, or not present. The methods, systems, and apparatuses described include tunability for the capacitor based on temperature and effective capacitance variations.

14 Claims, 8 Drawing Sheets

Related U.S. Application Data

(60) Provisional application No. 62/274,998, filed on Jan. 5, 2016.

(58) Field of Classification Search
USPC .......................................................... 348/706
See application file for complete search history.

(56) References Cited

U.S. PATENT DOCUMENTS

| | | | |
|---|---|---|---|
| 8,666,152 | B1 | 3/2014 | Ramanathan et al. |
| 9,319,616 | B2 | 4/2016 | Chang et al. |
| 9,462,211 | B2 | 10/2016 | Nakajima et al. |
| 9,554,061 | B1 | 1/2017 | Proctor, Jr. et al. |
| 9,749,552 | B2 | 8/2017 | Gopinath et al. |
| 10,038,936 | B2 * | 7/2018 | Aggarwal ........ H04N 21/44227 |
| 2007/0153132 | A1 | 7/2007 | Jong |
| 2007/0220150 | A1 | 9/2007 | Garg |
| 2009/0032325 | A1 | 2/2009 | Frieb-Preis et al. |
| 2009/0083825 | A1 * | 3/2009 | Miller ................... G09G 5/006 |
| | | | 725/151 |
| 2009/0150589 | A1 * | 6/2009 | Watarai ............... G06F 13/4081 |
| | | | 710/302 |
| 2010/0118193 | A1 | 5/2010 | Boyden et al. |
| 2011/0041154 | A1 | 2/2011 | Olson |
| 2011/0134330 | A1 | 6/2011 | Yu et al. |
| 2011/0157467 | A1 | 6/2011 | McRae |
| 2011/0161660 | A1 | 6/2011 | Zhang et al. |
| 2011/0300929 | A1 | 12/2011 | Tardif et al. |
| 2011/0317076 | A1 | 12/2011 | Chen et al. |
| 2012/0020647 | A1 | 1/2012 | Vogel |
| 2012/0036284 | A1 * | 2/2012 | Tao ................... H04N 21/43635 |
| | | | 710/16 |
| 2013/0229221 | A1 * | 9/2013 | Pan ................... G06F 15/17343 |
| | | | 327/365 |
| 2013/0299221 | A1 | 11/2013 | Oh et al. |
| 2014/0122059 | A1 | 5/2014 | Patel et al. |
| 2014/0132839 | A1 | 5/2014 | Chang et al. |
| 2014/0270696 | A1 | 9/2014 | Banks |
| 2014/0327833 | A1 * | 11/2014 | Kabuto ................... G06F 1/266 |
| | | | 348/730 |
| 2014/0347565 | A1 | 11/2014 | Fullam et al. |
| 2016/0044273 | A1 | 2/2016 | Thompson |
| 2016/0140075 | A1 | 5/2016 | Kashyap et al. |
| 2016/0142647 | A1 | 5/2016 | Gopinath et al. |
| 2017/0041554 | A1 | 2/2017 | Gopinath et al. |
| 2017/0075410 | A1 | 3/2017 | Fossati |
| 2017/0139456 | A1 | 5/2017 | Alou |
| 2017/0180899 | A1 | 6/2017 | Proctor, Jr. et al. |
| 2017/0310905 | A1 | 10/2017 | Gopinath et al. |

OTHER PUBLICATIONS

PCT/US2015/061379, "International Preliminary Report on Patentability received for PCT Patent Application No. PCT/US2015/061379, dated Jun. 1, 2017", 7 pages.

PCT/US2015/061379, "International Search Report and Written Opinion received for PCT Patent Application No. PCT/US2015/061379, dated Mar. 10, 2016", 10 pages.

* cited by examiner

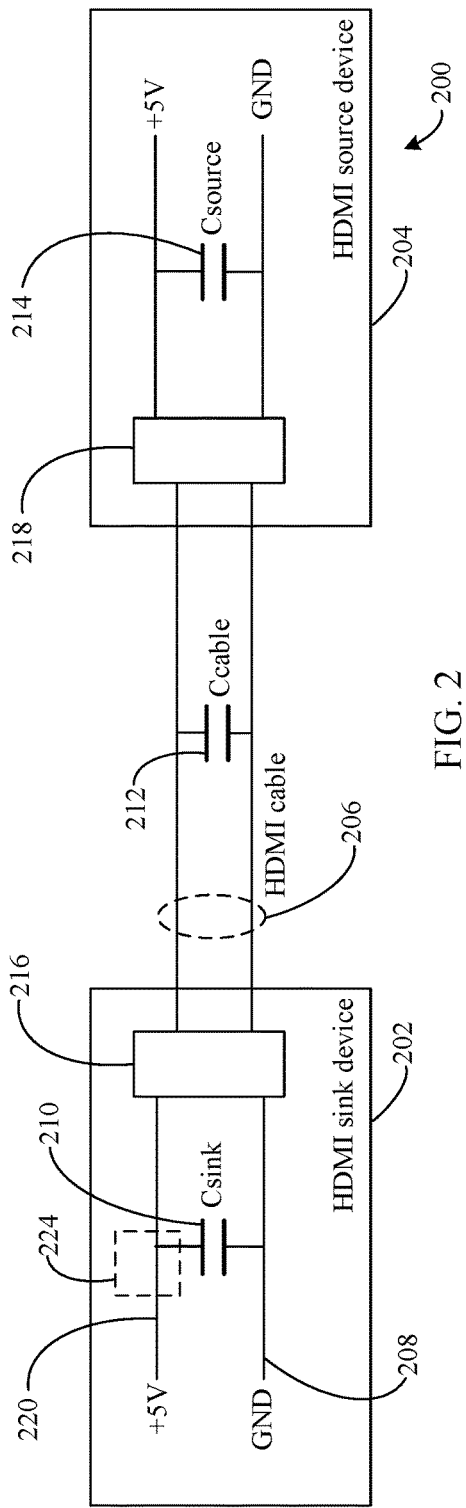
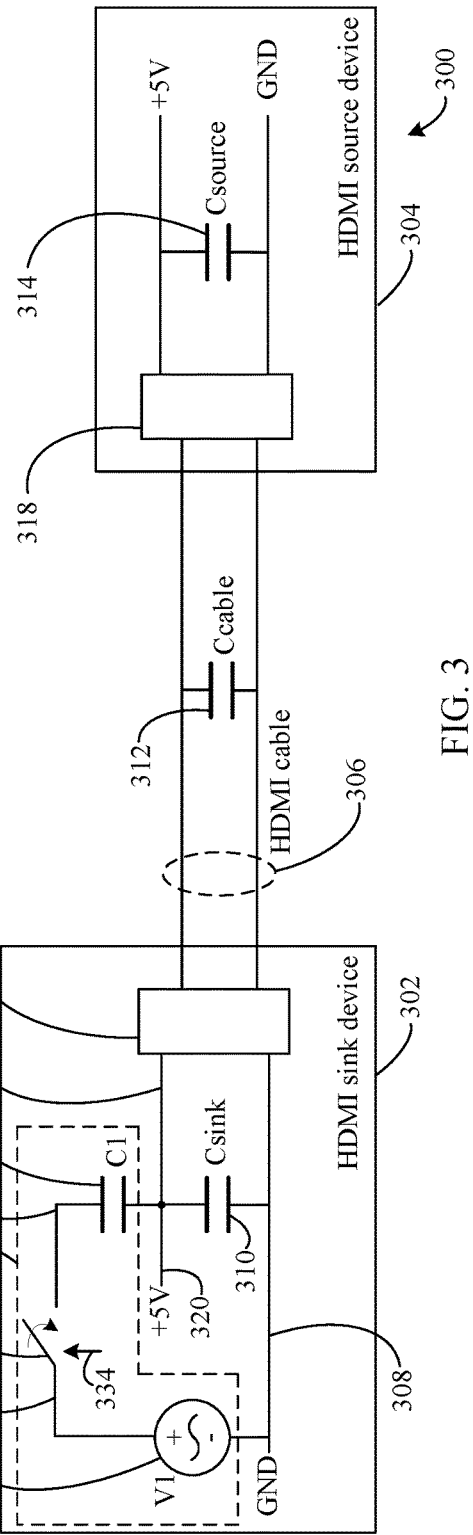
FIG. 2
FIG. 3

SOURCE DEVICE DETECTION

CROSS-REFERENCE TO RELATED APPLICATIONS

The present application is a continuation application of U.S. patent application Ser. No. 15/398,405, entitled "SOURCE DEVICE DETECTION," filed on Jan. 4, 2017, which claims priority to U.S. Provisional Application Ser. No. 62/274,998, entitled "SOURCE DEVICE DETECTION," filed on Jan. 5, 2016, the entireties of each of which are incorporated by reference herein.

The present application is related to U.S. patent application Ser. No. 14/945,125, filed Nov. 18, 2015, and entitled "AUTOMATIC IDENTIFICATION AND MAPPING OF CONSUMER ELECTRONIC DEVICES TO PORTS ON AN HDMI SWITCH," the entirety of which is incorporated herein by reference.

BACKGROUND

I. Technical Field

Embodiments described herein relate to source device detection and presence.

II. Background Art

HDMI is one of the fastest growing interfaces for audio and video consumption in the world today. Commonly used HDMI enabled devices may be classified as an HDMI Source: A device that sends an HDMI signal, such as a DVD player or Set-top box; an HDMI Sink: A device that receives an HDMI signal, such as an HDTV; and an HDMI Repeater: A device that both receives and sends HDMI signals, such as an A/V receiver. A/V receivers are considered HDMI repeaters.

BRIEF SUMMARY

Methods, systems, and apparatuses are described for source device detection and presence determinations, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 2 shows a block and circuit diagram of an HDMI system, according to example embodiments.

FIG. 3 shows a block and circuit diagram of an HDMI system with a presence circuit, according to example embodiments.

Figure 1:
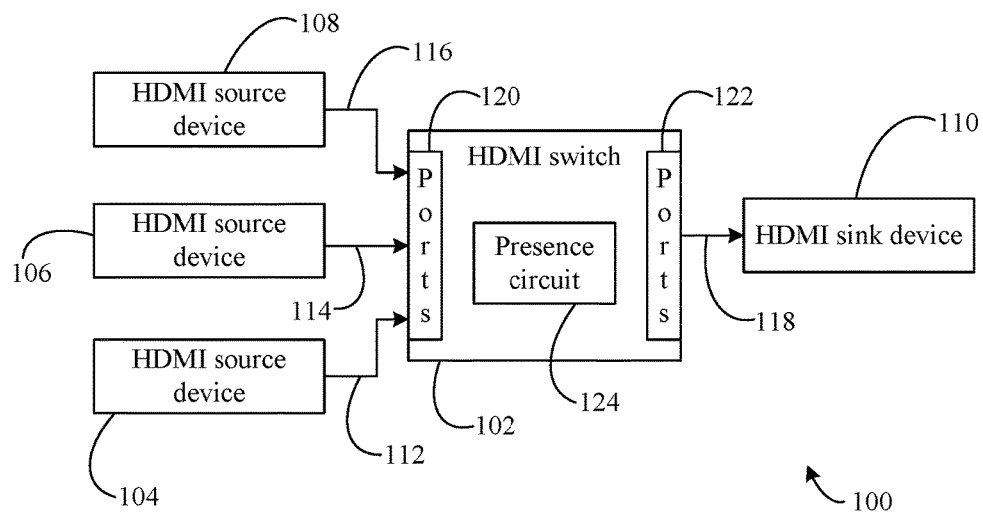
FIG. 1 shows a block diagram of an HDMI system, according to an example embodiment.

Embodiments will now be described with reference to the accompanying drawings.

In the drawings, like reference numbers indicate identical or functionally similar elements. Additionally, the left-most digit(s) of a reference number identifies the drawing in which the reference number first appears.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

The example techniques and embodiments described herein may be adapted to various types of systems and devices, for example but without limitation, HDMI-enabled devices, such as HDMI switches and/or repeaters, communication devices (e.g., cellular and smart phones, etc.), computers/computing devices (e.g., laptops, tablets, desktops, etc.), computing systems, electronic devices, gaming consoles, home electronics and entertainment devices (e.g., home theater systems, stereos, televisions, media players, set top boxes, DVD players, etc.), and/or the like. It is contemplated herein that in various embodiments and with respect to the illustrated figures of this disclosure, one or more components described and/or shown may not be included and that additional components may be included. It is also contemplated herein that in various embodiments and with respect to the illustrated figures of this disclosure, one or more components described and/or shown may be electrically- and/or communicatively-coupled to other components in alternative and/or equivalent manners.

The embodiments and techniques described herein allow for source device detection, such as HDMI source device detection. HDMI has significantly reduced the complexity of connecting multiple audio and video cables between a source and a sink. An example system 100 is shown in FIG. 1. System 100 includes an HDMI switch 102, which is configured with one or more HDMI input ports 120 and/or HDMI output ports 122. System 100 also includes HDMI sourced devices: a first HDMI source 104, a second HDMI source 106, and a third HDMI source 108; and one or more HDMI sink devices: illustrated as an HDMI sink 110. HDMI switch 102 is connected to first HDMI source 104 via an HDMI connection 112, to second HDMI source 106 via an HDMI connection 114, to third HDMI source 108 via an HDMI connection 116, and to HDMI sink 110 via an HDMI connection 118. HDMI connections as described herein may be embodied as HDMI cables or equivalent wired/wireless connectors. HDMI input ports 120 and/or HDMI output ports 122 may be dynamically configurable ports, in embodiments. That is, each of these ports may be configured as input or output ports based on the type of HDMI device connected thereto.

HDMI switch 102 also includes a presence circuit 124. Presence circuit 124 is configured to determine if an HDMI source device is present (i.e., a presence state) at a port of HDMI switch 102, e.g., one or more HDMI input ports 120 and/or HDMI output ports 122, according to embodiments and as described herein. Presence circuit 124 is also configured to determine if an HDMI source device is powered on, is in stand-by, or is powered off when present, which is also part of the presence state according to embodiments. Presence circuit 124 may be configured to determine a presence state by utilizing a voltage divider circuit (e.g., utilizing capacitive divider action) as described below.

In order to simplify user experiences for using multiple devices, multiport HDMI switch designs are envisioned as described in U.S. patent application Ser. No. 14/945,125, filed Nov. 18, 2015, and entitled "AUTOMATIC IDENTIFICATION AND MAPPING OF CONSUMER ELECTRONIC DEVICES TO PORTS ON AN HDMI SWITCH," the entirety of which is incorporated herein by reference. In accordance with the embodiments and techniques described herein, the proposed HDMI switch is configured with logic that enables it to understand if an HDMI source device is connected to the HDMI switch or not.

The techniques and embodiments herein provide for novel devices, circuits, systems, and methods to detect presence/absence of an HDMI source when interfaced with an HDMI sink using an HDMI cable. For example, according to embodiments, HDMI switch 102, acting as an HDMI sink, may be configured to detect when an HDMI source is connected thereto, such as first HDMI source 104, second HDMI source 106, and/or third HDMI source 108. Even though this system is explained in relation to an HDMI interface, the basic principles herein can be used to detect devices on other interfaces like universal serial bus (USB), Ethernet, digital circuit connectors (HDMI switches, gaming consoles, televisions, set top boxes), in-line adapter connectors, etc., as well, according to embodiments.

In some embodiments, cable/connector lengths may be limited to 1 m, 2 m, or 5 m, although other lengths are contemplated herein. Cables and connectors may carry data or embody data lines with DC or approximately DC characteristics, according to embodiments, such that the cables and connectors do not introduce critical capacitance via high speed/frequency issues.

In embodiments, the described detection techniques may be rendered inactive or idle when an HDMI device is detected and connected, and may be active otherwise.

According to the HDMI Specification, +5V is provided by a source device over an HDMI connection (i.e., an HDMI cable) whenever the source device is connected to a sink device and is active or in an ON state. However, when +5V is not present on the HDMI connector of the sink, it can imply three different scenarios: 1) the source device is switched OFF; 2) the source device is in standby; or 3) the HDMI cable between the source device and the sink device is disconnected.

The techniques and embodiments herein allow for identification of a source device if the source device is connected or not even when the +5V signal is not present. Accordingly, the techniques and embodiments described herein provide for improvements source device detection, including dynamic determinations of effective capacitances and tunable capacitor values.

For instance, methods, systems, devices, and apparatuses are provided for source device detection. A method in accordance with an example aspect is described. The method includes providing a voltage divider circuit across a voltage associated with an HDMI port, and supplying a first voltage to the voltage divider. The method also includes measuring a second voltage of the voltage divider based on the first supplied voltage, and determining a presence state of an HDMI source device based at least on the second voltage that is measured.

A system in accordance with another example aspect is described. The system includes an input port having an associated conductive element, the input port being configured to receive an HDMI connector for an HDMI source device, and a voltage divider circuit across the associated conductive element. The system also includes a signal source device configured to provide an electrical signal to the voltage divider circuit, a voltage measurer configured to measure a voltage of the voltage divider, and a determination component configured to determine a presence state of HDMI source devices based on the voltage of the voltage divider.

A system in accordance with yet another example aspect is described. The system includes a resistor-capacitor (RC) circuit that includes a resistor with a resistance and a capacitor with a capacitance approximately equal to combined capacitances of an HDMI sink device comprising the RC circuit, an HDMI source device, and an HDMI connector therebetween, and a signal source device configured to provide an electrical signal to the capacitor. The system also includes a voltage measurer configured to measure voltages of the capacitor while the capacitor is charged by the electrical signal, and a determination component. The determination component is configured to determine an effective value of the capacitance, and to set a divider capacitance value of a first voltage divider capacitor of a voltage divider circuit based on the effective value, a second voltage divider capacitor of the voltage divider circuit having a capacitance approximately equal to the effective value.

Various example embodiments are described in the following Sections. In particular, example presence circuit embodiments are described. This description is followed by example tunable and effective capacitance embodiments. Example isolation circuit embodiments are then provided. Next, further example embodiments and advantages are described, and subsequently an example computing device implementation is described. Finally, some concluding remarks are provided. It is noted that the division of the following description generally into Sections and/or subsections is provided for ease of illustration, and it is to be understood that any type of embodiment may be described in any Section or subsection.

III. Example Presence Circuit Embodiments

As noted above, systems, devices, and circuits for HDMI source detection, such as circuits in an HDMI switch, along with their respective components such as presence circuits, may be configured in various ways to determine HDMI source device presence states.

In embodiments, by way of illustrative example and not limitation, an HDMI switch or equivalent component may be configured to act as, and/or perform one or more functions of, an HDMI sink device. For instance, an HDMI switch may include one or ports that are configured to, or may be dynamically configured and mapped to, act as input ports for connecting HDMI source devices via connector cables. When a connector cable, e.g., an HDMI cable, is connected to the port of the HDMI switch, there are a number of presence state possibilities: 1) an HDMI source device is connected to the other end of the connector and is powered on, 2) an HDMI source device is connected to the other end of the connector and is not powered on or is in a stand-by or sleep mode, and 3) an HDMI source device is not connected to the other end of the connector (i.e., there is not a device connected, or there is a connected device that is not an HDMI source device). The HDMI switch may determine the presence state based on a presence circuit, such as presence circuit 124 of FIG. 1.

Referring to FIG. 2, a block and circuit diagram of an HDMI system 200 ("system" 200) is shown, according to an embodiment. System 200 may be a further embodiment of system 100 of FIG. 1. System 200 includes an HDMI sink device 202 (which may be an HDMI switch in embodiments), an HDMI source device 204, and an HDMI cable 206 configured to connect HDMI source device 204 to HDMI sink device 202. HDMI sink device 202 and HDMI source device 204 may each include respective ports or connectors (e.g., a port 216 and a port 218) into which HDMI cable 206 may be inserted to make the connection therebetween. As shown in FIG. 2, between a +5V line 220 and a ground plane/node 208 ("GND") of system 200, there are three capacitances that are connected in parallel: a capacitance Csource, a capacitance Ccable, and a capacitance Csink. For illustrative and descriptive purposes, these capacitances are referred to herein as realized "capacitors," although it should be noted that one or more components of the described systems and components may contribute to each of the individual capacitances.

A capacitor Csink 210 is illustrated in HDMI sink device 202. Csink 210 represents the capacitance between +5V line 220 and GND 208 of HDMI sink device 202, e.g., but without limitation, on a printed circuit board (PCB) of HDMI sink device 202 or the like. Csink 210 has a capacitive value equivalent to the connective capacitance of HDMI sink device 202.

A capacitor Ccable 212 is illustrated in HDMI cable 206. Ccable 212 represents the capacitance between +5V line 220 and GND 208 within HDMI cable 206. Ccable 212 has a capacitive value equivalent to the connective capacitance of HDMI cable 206.

A capacitor Csource 214 is illustrated in HDMI source device 204. Csource 214 represents the capacitance between +5V line 220 and GND 208 of HDMI source device 204, e.g., but without limitation, on a PCB of HDMI source device 204 or the like. Csource 214 has a capacitive value equivalent to the connective capacitance of HDMI source device 204.

As noted above, the techniques and embodiments herein allow for leveraging capacitive divider action, for example, between a known or previously measured capacitance and the capacitances as shown in system 200 of FIG. 2. Subsequently, using associated voltage division, a clear logic signal may be triggered for a microcontroller or processor, e.g., of an HDMI sink/switch or computing/processing device as described herein, to make a determination of an HDMI source presence state.

System 200 may also include a presence circuit 224 that may be an embodiment of presence circuit 124 of FIG. 1, as described in further detail herein.

For instance, a block and circuit diagram of an HDMI system 300 ("system" 300) is shown in FIG. 3, according to an embodiment. System 300 may be a further embodiment of system 100 of FIG. 1 and/or system 200 of FIG. 2. For instance, system 300 includes an HDMI sink device 302, an HDMI source device 304, and HDMI cable 306, as similarly provided in system 200 of FIG. 2, as well as a GND 308 and a +5V line 320, a capacitor Csink 310, a capacitor Ccable 312, and a capacitor Csource 314. System 300 also includes additional components in HDMI sink device 202: a capacitor C1 322 (having a capacitance that may be pre-measured/pre-determined or dynamically determined), a switch 324, and a current source 326, which may collectively comprise at least a portion of a presence circuit 332. In embodiments, capacitor C1 302 is electrically connected between Csink 310 and +5V line 320 by an electrical connector 308. The output of current source 326 is provided via an electrical connector 330 to switch 324, as shown, and C1 322 is electrically connected to switch 324 via an electrical connector 328.

In embodiments, current source 326 may be an alternating current (AC) source, while in other embodiments current source 326 may be a digital to analog converter (DAC), a clock source, or a voltage source, paired with zero or more additional circuit components (not shown), to provide an equivalent circuit to that as illustrated in FIG. 3.

As noted, switch 324 may be electrically coupled between C1 322 and current source 326. In embodiments, switch 324 is configured to open (i.e., be "off") and close (i.e., be "on") according to a control signal provided via a control connector 334, described in further detail herein. When switch 324 is configured to be open, a present HDMI source device that is powered on causes a certain voltage to be held on +5V line 320. When switch 324 is configured to be closed, a present HDMI source device that is not in a powered-on state causes another voltage to be held on +5V line 320, and anon-present state causes yet another voltage to be held on +5V line 320, as described in further detail below.

For example, as noted above, capacitors representative of component capacitances, e.g., Csink 310, Ccable 312, and Csource 314, may comprise capacitance values from one or more components of HDMI sink device 302, HDMI cable 306, and HDMI source device 304.

In embodiments, a capacitance value of C1 322 may be pre-selected or dynamically configured based on an effective capacitance value from the combination of Csink 310, Ccable 312, and Csource 314, as described herein. A capacitance value of C1 322 may be pre-selected or dynamically configured to have a capacitance value of approximately ten times the described effective capacitance value of Csink 310, Ccable 312, and capacitor Csource 314, although values greater or less than this are also contemplated herein.

Accordingly, in system 300, C1 322 is connected in relation to Csink 310 and current source 326 such that C1 322 forms a capacitor voltage divider at the node between C1 322 and Csink 310 (i.e., at +5V line 320). During operation when an HDMI source device (e.g., HDMI source device 304) is powered on and connected to HDMI sink device 302, +5V line 320 carries a +5V signal in accordance with the HDMI specification. Based on the known or configured capacitance value of C1 322, and the effective capacitance value of Csink 310, Ccable 312, and capacitor Csource 314, a presence state of an HDMI source device may be determined according to the voltage value at +5V line 320 for presence states including 1) an HDMI source device is connected to the other end of the connector and is powered on, 2) an HDMI source device is connected to the other end of the connector and is not powered on or is in a stand-by or sleep mode, and 3) an HDMI source device is not connected to the other end of the connector (i.e., there is not a device connected, or there is a connected device that is not an HDMI source device), in embodiments.

The following are non-limiting examples to further illustrate the configuration of system 300 of FIG. 3. For example, values for Csink 310 may be less than or equal to values for Csource 314 in embodiments. Ccable 312 may have a capacitance that is much smaller than that of Csink 310 or Csource 314 and may be ignored for, or used in, most of the calculations, techniques, and/or embodiments herein. Accordingly, in embodiments, if HDMI source device 304 is connected through HDMI cable 306 to HDMI sink device 302, the capacitance of +5V line 320 will be doubled (i.e., for capacitance values, if Csink 310≈Csource 314), irrespective of the power status of HDMI source device 304. Thus, the techniques and embodiments herein provide a way to identify the addition of capacitance on +5V line 320.

Referring still to FIG. 3 and the three components of presence circuit 322, an example is provided. Current source 326 may be an AC voltage source with a voltage V1 for purposes of the discussion below. Current source 326 may also output a square waveform or pulsating waveform. In embodiments, a frequency of approximately 27 kHz-30 kHz may be used by current source 326, although other frequencies are contemplated herein. Embodiments allow for tuning the source frequency for capacitance in cables and/or connector circuits, as described herein. Additionally, in embodiments the voltage value may be a value less than or equal to the voltage line value (e.g., a voltage value for +5V line 320 of +5V); in some example embodiments, a 3V value may be used. In some embodiments, a DAC output may be used as the source in lieu of current source 326.

C1 322 may be a known capacitor or a measured capacitor, or may comprise a capacitor bank that is dynamically tunable as described herein. Switch 324 is configured to connect or disconnect current source 326 to capacitor C1 322. Switch 324 may be controlled by a controller, processor, logic, and/or the like (not shown), according to a program, flowchart, state machine, etc., as contemplated herein and described in further detail below.

Figure 4:
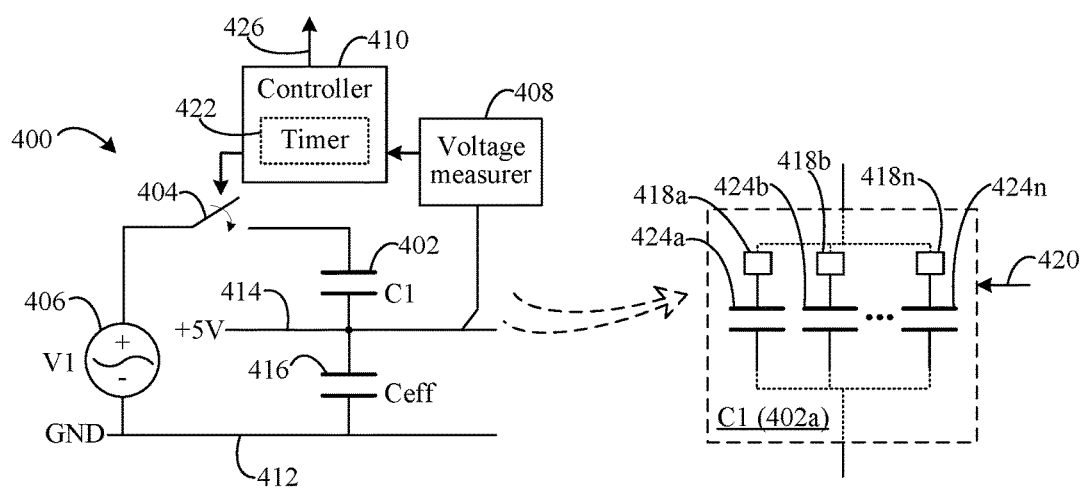
FIG. 4 shows a block and circuit diagram of a presence circuit, according to an example embodiment.

In this example, switch 324 is in an off state (i.e., is open) when HDMI source device 304 is powered ON and +5V is being provided thereby. When HDMI sink device 302 detects that the +5V is not present, then switch 324 is closed or in an on state according to a control signal on connector 334. When switch 324 is closed or in an on state, the AC voltage V1 is divided between C1 322 and the effective capacitance of Csink 310, Csource 314, and Ccable 312 (i.e., Ceff 416 as shown in FIG. 4 and described below). In other words, switch 324 is open when HDMI source device 304 is connected and powered on. If powered HDMI source device 304 is not detected by HDMI sink device 302, switch 324 is closed and C1 322 and the effective capacitance noted above form a voltage divider based on current source 326.

The value of the effective capacitance ("Ceffective" below) of Csink 310, Csource 314, and Ccable 312 may be different for different scenarios, according to embodiments. For instance:

Case 1: When no HDMI source device 304 or HDMI cable 306 is connected to HDMI sink device 302, then: Ceffective (1)=Csink 310.

Case 2: When only HDMI cable 306 is connected to HDMI sink device 302, but HDMI source device 304 is not connected at the other end of HDMI cable 306, then: Ceffective (2)=Csink 310 in parallel to Ccable 312.

Case 3: When HDMI source device 304 is connected to HDMI sink device 302 through HDMI cable 306, then: Ceffective (3)=Csink 310 in parallel to Ccable 312 in parallel to Csource 314.

When HDMI cable 306 capacitance is very low, Ceffective (1)≈ Ceffective (2). Thus, in such a scenario, if capacitors C1 322 and Csink 310 are appropriately selected, there will exist distinctly different voltages at the junction (+5V line 320) between C1 322 and Csink 310 as shown in FIG. 3. This difference in voltage can then be used to identify the state of connectivity, i.e., the presence state, of HDMI source device 304.

Continuing with this example, let V1 be the effective voltage from current source 326. In this non-limiting example, V1=3V (average voltage), and let:

C1 322=10 nF;
Csink 310=10 nF;
Ccable 312=100 pF; and
Csource 314=100 nF.

According to Cases 1 and 2 above, the voltage at +5V line 320≈ V1×C1/(C1+Ceffective (1))=1.5V.

According to Case 3 above, the voltage at +5V line 320=V1×C1/(C1+Ceffective (3))=0.25V.

As can clearly be seen from the values above, it is possible to distinctly differentiate between presence states when HDMI source device 304 is connected to HDMI sink device 302, and when it is not. Measurement of voltage values at +5V line 320 may be performed in multiple ways in embodiments (not shown, but described below), including but not limited to, 1) using an analog to digital converter (DAC) or analog to digital convert (ADC) to monitor voltage changes, 2) using signal conditioning and level translation schemes to detect a high or a low voltage, and 3) using a voltage sensor or measurer such as a voltmeter and/or the like.

Additionally, according to embodiments, there are multiple algorithms contemplated herein to identify the presence states of HDMI source devices when the voltage at +5V line 320 can be distinctly differentiated for different states. It is also contemplated that state machines may be used for state tracking. Algorithms and/or state machines may be implemented in hardware, firmware, and/or software, or any combination thereof, and in conjunction with controllers or other determination components.

It should be noted that other capacitor/current source configurations are also contemplated herein. The example provided above is illustrative in nature, and is not to be considered limiting.

Referring also now to FIG. 4, a block and circuit diagram of a presence circuit 400 is shown, according to an embodiment. Presence circuit 400 may be a further embodiment of presence circuit 332 of system 300 of FIG. 3. That is, presence circuit 400 includes a capacitor C1 402 (that may be pre-measured/pre-determined or dynamically determined), a switch 404, and a current source 406, as similarly described with respect to presence circuit 332 of system 300 of FIG. 3, in embodiments. Presence circuit 400 also includes a voltage measurer 408 and a controller 410. In embodiments, capacitor C1 402 is electrically connected between switch 404, which is electrically coupled to a GND 412, and a capacitor Ceff 416 (at a +5V line 414). The output of current source 406 is provided via an electrical connector to switch 404.

C1 402 may be embodied as one or more capacitors. For example, in some configurations of presence circuit 400, C1 402 may be a single capacitor with a capacitance selected based on known or estimated effective capacitance values of systems 200 or 300. In other configurations, C1 402 may be a configuration of multiple capacitors and/or a capacitor bank illustrated as alternative C1 402a. Alternative C1 402a (capacitor bank) may comprise 'n' capacitors 424a, 424b, . . . , 424n in one or more configurations (illustrated in a parallel configuration) to provide a variety of overall capacitive values. Capacitors 424a, 424b, . . . , 424n of alternative C1 402a may be activated for use according to an activation signal on connector 420 that controls activators 418a, 418b, . . . , 418n. The illustrated alternative C1 402a is exemplary and non-limiting in nature, and other capacitor bank configurations, including additional components or excluding illustrated components, are contemplated herein. Additionally, the illustrated components of alternative C1 402a may arranged/configured in ways other than as shown (e.g., one or more of activators 418a, 418b, . . . , 418n may be placed on the opposite sides of their respective capacitors 424a, 424b, . . . , 424n, etc.).

Figure 5:
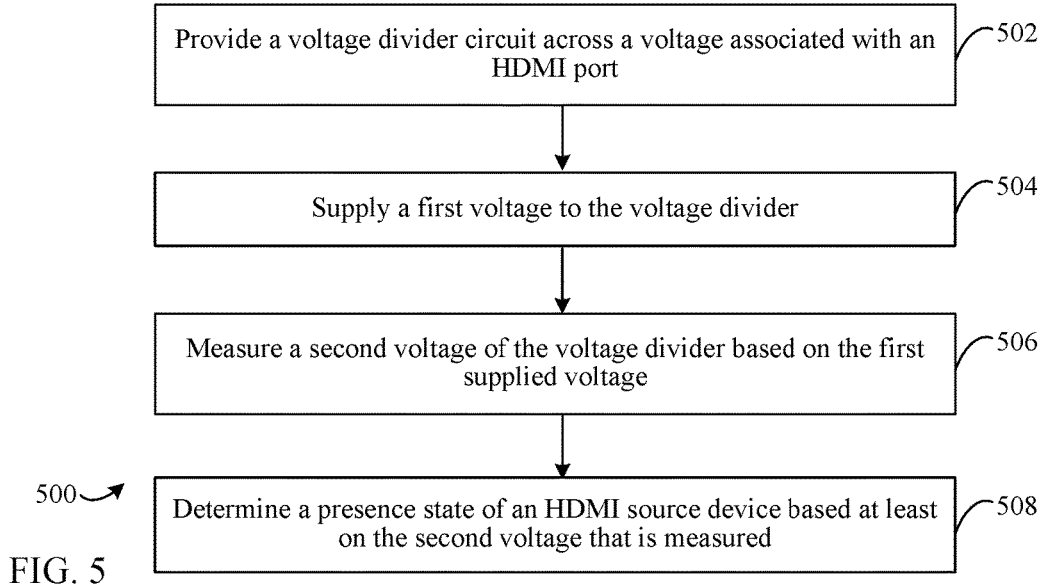
FIG. 5 shows a flowchart for detecting source device presence, according to an example embodiment.

Turning also to FIG. 5, a flowchart 500 for detecting source device presence is shown, according to an embodiment. Embodiments described herein may be configured to perform source device detection according to flowchart 500. For instance, system 200 of FIG. 2, system 300 of FIG. 3 and presence circuit 400, along with any respective components/subcomponents thereof, may be configured to perform source device detection according to flowchart 500. Flowchart 500 is described as follows.

A voltage divider circuit is provided across a voltage associated with an HDMI port (502). For instance, Ceff 416 represents a capacitor and/or the effective capacitance value of Csink 310, Ccable 312, and Csource 314 of system 300 in FIG. 3, according to embodiments. C1 402 and Ceff 416 form a voltage divider around their common node at +5V line 414, which may correspond to +5V line 320 and port(s) 316 of FIG. 3.

A first voltage is supplied to the voltage divider (504). For example, current source 406 (which may correspond to current source 326 of FIG. 3) is configured to provide voltages to C1 402 by charging C1 402 via switch 404 when switch 404 is closed or "on." Initially, controller 410 may configure switch 404 to be open or "off." The first voltage corresponds to no voltage associated with current source 406 for an electrical signal being driven to C1 402 of the voltage divider due to switch 404 being open, according to embodiments. That is, when switch 404 is open, the voltage provided to the voltage divider corresponds to the voltage supplied via the HDMI port (e.g., pert(s) 316) at +5V line 414.

A second voltage of the voltage divider is measured based on the first supplied voltage (506). For instance, voltages at the common node of the voltage divider (+5V line 414) are measured or sensed by voltage measurer 408. Voltage measurer 408 is configured to provide measured voltages, such as the second voltage, to controller 410. In embodiments, controller 410 is configured to provide control signals to switch 404 based on voltages at +5V line 414 that are measured or sensed by voltage measurer 408. Controller 410 may base control signals on voltages measured or sensed by voltage measurer 408 after a given time period of measuring/sensing has elapsed in order to give C1 402 and/or Ceff 416 sufficient time to charge from the electrical signal provided by current source 406 based on a timer 422.

A presence state of an HDMI source device is determined based at least on the second voltage that is measured (508). For example, controller 410 is configured to determine a presence state based on the voltages measured or sensed by voltage measurer 408, such as the second voltage measured in (506). According to embodiments, determinations of presence state are further based on the measured or sensed voltages and the configuration of switch 404 (i.e., open or closed). Controller 410 is also configured to provide a logic signal via a connector 426 to a microcontroller or processor, e.g., of an HDMI sink/switch or computing/processing device as described herein, to make a determination of the HDMI source presence state or to perform other functions such as port mapping, etc. In some embodiments, controller 410 comprises such microcontrollers or processors, or controller 410 may comprise a separate controller or circuit, or may comprise software executing on a microcontroller or processor, as described herein.

Figure 6:
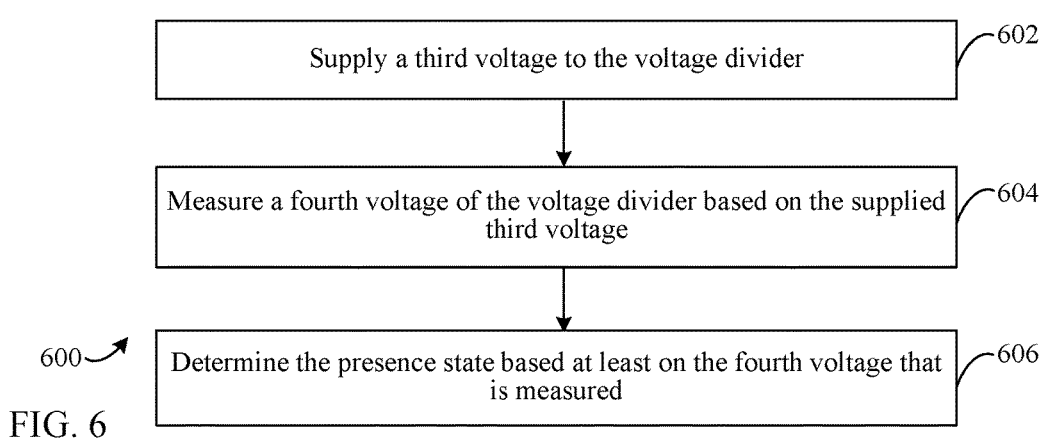
FIG. 6 shows a flowchart for detecting source device presence, according to an example embodiment.

Referring also to FIG. 6, a flowchart 600 for detecting source device presence is shown, according to an embodiment. Embodiments described herein may be configured to perform source device detection according to flowchart 600. For instance, system 200 of FIG. 2, system 300 of FIG. 3 and presence circuit 400, along with any respective components/subcomponents thereof, may be configured to perform source device detection according to flowchart 600. Flowchart 600 may comprise additional operations for flowchart 500 of FIG. 5. Flowchart 600 is described as follows.

A third voltage is supplied to the voltage divider (602). In embodiments, (602) may be performed after (506) and before (508) of flowchart 500. For example, based on the voltage measured in (506), one or more additional operations may be performed beginning at (602). Switch 404 may be configured into a closed state by controller 410 based on the voltage measured by voltage measurer in (506) when switch 404 is open.

The supplied third voltage corresponds to the voltage associated with current source 406, according to embodiments. The voltage associated with current source 406 may be less than +5V, between +5V and +3V, or may be another value according to implementation-specific factors such as communication protocol, device type, circuit configuration, and/or the like. The voltage associated with current source 406 may correspond to an upper- and lower-bound between which current source 406 oscillates or alternates (e.g., for sinusoidal sources, clock sources, DACs, etc.), and may comprise a direct current (DC) offset or bias voltage. Switch 404 may be configured to be closed according to a control signal from controller 410 to allow the electrical signal from current source 406 to be provided to C1 402 of the voltage divider in (602).

A fourth voltage of the voltage divider is measured based on the supplied third voltage (604). For instance, the supplied third voltage from current source 406 via closed switch 404 in (602) may charge C1 402 of the voltage divider. After a determined or specified charging time, voltage measurer 408 measures or senses the voltage at the common node of the voltage divider between C1 402 and Ceff 416 (i.e., at +5V line 414). Voltage measurer 408 is configured to provide measured voltages, such as the fourth voltage, to controller 410.

The presence state is determined based at least on the fourth voltage that is measured (606). For example, controller 410 is configured to determine a presence state based on the voltages measured or sensed by voltage measurer 408, such as the fourth voltage measured in (604). According to embodiments, determinations of presence state are further based on the measured or sensed voltages and the configuration of switch 404 (i.e., open or closed). The presence state determined in (606) may be included as a part of (508) in some embodiments.

An example embodiment with respect to system 300 and presence circuit 400, and flowchart 500 and flowchart 600, will now be described. In the described example, a current source with an associated voltage of +5V and a capacitance value for C1 402 that is approximately 10 times that of Ceff 416 are assumed. Additionally, comparison thresholds (for comparing measured/sensed voltages in order to make presence state determinations) are assumed as +4V and +0.5V, although other thresholds are contemplated herein.

Figure 7:
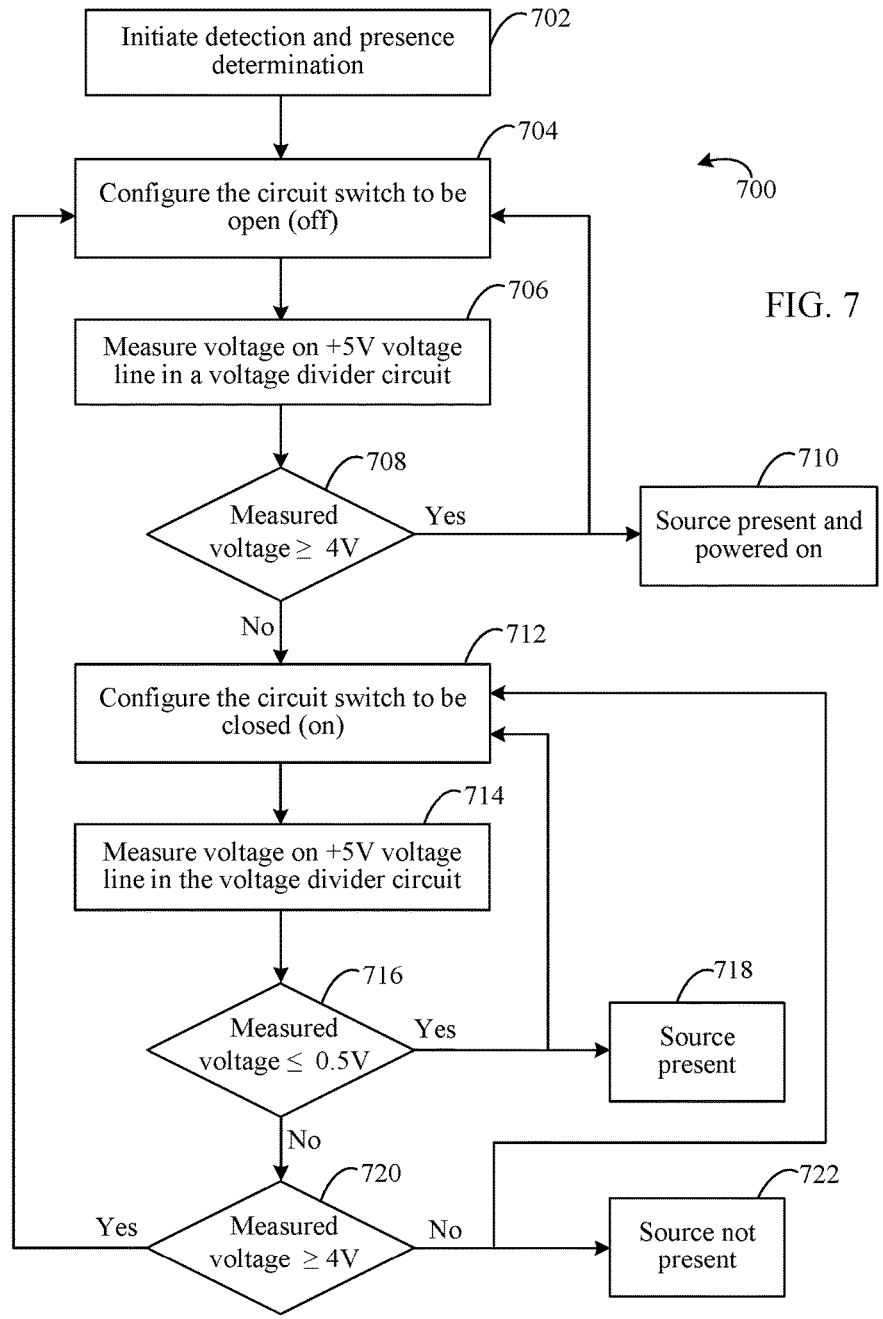
FIG. 7 shows a flowchart for detecting source device presence, according to an example embodiment.

Referring now to FIG. 7, a flowchart 700 for detecting source device presence is shown, according to an embodiment. Embodiments described herein may be configured to perform source device detection according to flowchart 700. For instance, system 200 of FIG. 2, system 300 of FIG. 3, and presence circuit 400, along with any respective components/subcomponents thereof, may be configured to perform source device detection according to flowchart 700. Flowchart 700 may comprise an example embodiment of flowchart 500 of FIG. 5 and/or flowchart 600 of FIG. 6. Flowchart 700 is described as follows.

Detection and presence determination is initiated (702). For instance, detection and presence determination may commence when an HDMI sink device such as HDMI sink device 302 (which may be an HDMI switch) detects that an HDMI cable such as HDMI cable 306 has been plugged in or if the status of the cable or device thereon changes. Presence circuit 400 of FIG. 4, when included in system 300 in HDMI sink device 302 (which may be an HDMI switch) as an example, is configured to determine a presence state of an HDMI source device such as HDMI source device 304 as noted herein.

The circuit switch is configured to be open (off) (704). For example, controller 410 of presence circuit 400 is configured to provide control signals to switch 404 to cause the configuration of switch 404 to be open or off (if switch 404 is already open, it may remain so) such that electrical signals from current source 406 are not provided to C1 402 of the voltage divider circuit described in FIG. 4.

The voltage on the +5V voltage line in a voltage divider circuit is measured (706). In embodiments, voltage measurer 408 is configured to measure the common node between C1 402 and Ceff 416 (i.e., +5V voltage line 414), as described herein. The measured/sensed voltage value is provided by voltage measurer 408 to controller 410.

If the measured voltage is ≥4V (708), the presence state is determined by controller 410 as a source being present and powered on (710), and flowchart 700 returns to (704) above. That is, when switch 404 is open, and an HDMI source device is connected to an HDMI sink device, e.g., via an HDMI cable as described herein, and the HDMI source device is powered on, the HDMI source device will provide a +5V signal to the voltage divider on +5V voltage line 414. Accordingly, the measured/sensed voltage by voltage measurer 408 will be approximately +5V which is greater than or equal to the +4V comparison threshold.

If the measured voltage is not ≥4V (708), flowchart 700 proceeds to (712). That is, when switch 404 is open and current source 406 does not provide +5V to the voltage divider at C1 402, and the HDMI source device is either connected to the HDMI sink device but not powered on, or the HDMI source device is not connected, the HDMI source device will not provide a +5V signal to the voltage divider on +5V voltage line 414. Accordingly, the measured/sensed voltage by voltage measurer 408 will be less than the +4V comparison threshold, and further operations may be performed in order for controller 410 to determine the exact presence state (as currently the intermediate determination would be that there is not a connected and powered-on HDMI source device).

The circuit switch is configured to be closed (on) (712). For example, controller 410 of presence circuit 400 is configured to provide control signals to switch 404 to cause the configuration of switch 404 to be closed or on such that electrical signals from current source 406 are provided to C1 402 of the voltage divider circuit described in FIG. 4. As noted in (708) above, controller 410 has made an intermediate determination that there is not a connected and powered-on HDMI source device, and therefore, +5V voltage line 414 is not driven by an HDMI source device. In such cases, controller 410 causes switch 404 to close (if switch 404 is already closed, it may remain so) and C1 402 is charged by current source 406.

The voltage on the +5V voltage line in the voltage divider circuit is measured (714). In embodiments, voltage measurer 408 is configured to measure the common node between C1 402 and Ceff 416 (i.e., +5V voltage line 414), as described herein. In (714), the voltage measured by voltage measurer 408 may be measured/sensed as C1 402 charges subsequent to switch 404 closing, or may be measured/sensed after a determined or specified charging time has elapsed. In either case, a measured/sensed voltage value is provided by voltage measurer 408 to controller 410.

If the measured voltage is ≤0.5V (716), the presence state is determined by controller 410 as a source being present but not powered on (718), e.g., in an off or stand-by mode, and flowchart 700 returns to (712) above. That is, when switch 404 is closed, and an HDMI source device is connected to an HDMI sink device, e.g., via an HDMI cable as described herein, and the HDMI source device is not powered on, the HDMI source device will not provide a +5V signal, but rather will not drive the power line and approximately 0V is provided to the voltage divider on +5V voltage line 414. Accordingly, when current source 406 provides a +5V signal via switch 404 to C1 402, the top plate of C1 402 receiving the electrical signal will have a voltage value many times greater than the measured/sensed voltage by voltage measurer 408 will be approximately 0V which is less than or equal to the +0.5V comparison threshold.

If the measured voltage is not ≤0.5V (716), it is then determined if the measured voltage is ≥4V (720) by controller 410. If the measured voltage is not ≥4V (720), controller 410 determines that the presence state is that an HDMI source device is not present (722), and flowchart 700 returns to (712). If the measured voltage is ≥4V (720), flowchart 700 returns to (704) where controller 410 may determine that the presence state is that an HDMI source device is present and powered on (722) based on the voltage measured.

IV. Example Tunable and Effective Capacitance Embodiments

In embodiments, the top capacitor of voltage divider circuits described herein, e.g., C1 402 of presence circuit 400 in FIG. 4, may be configured to predetermined capacitance values and/or may be dynamically tunable as configurations of capacitor banks. Embodiments also provide for determining an effective capacitance, e.g., Ceff 416 as described with respect to FIG. 4.

Figure 8:
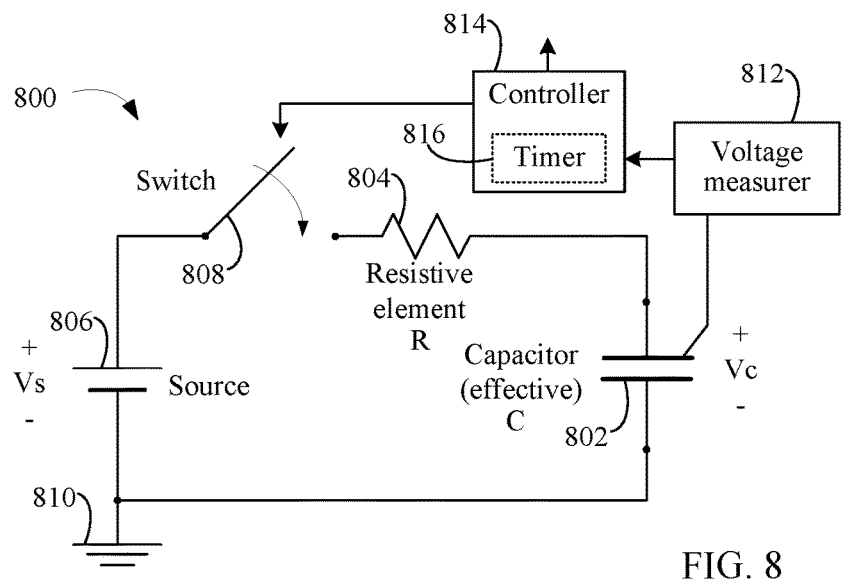
FIG. 8 shows a block and circuit diagram for determining an effective capacitance and setting a capacitor value, according to an example embodiment.

Turning now to FIG. 8, a circuit 800 represented according to an example embodiment. Circuit 800 may be a further embodiment of presence circuit 400 of FIG. 4, or may be a separate circuit.

Circuit 800 of FIG. 8 includes a capacitor 802 with capacitance C that represents the effective capacitance of a line to be measured (analogous to Ceff 416 of FIG. 4). To initialize the determination of the effective capacitance for capacitor 802, a controller 814 may close a switch 808 to provide an electrical path between a source 806 and a resistive element 804. With a known and stable source 806 (with an associated voltage Vs) electrically connected, and resistive element 804 with a known resistance value (R) is in series with capacitor 802, by calculating the time taken to charge capacitor 802 to different values (Vc), the effective capacitance "C" of capacitor 802 may be calculated by controller 814 based on the voltage of capacitor 802 that is measured/sensed by a voltage measurer 812. Controller 814, with timer 816, switch 808, and voltage measurer 812 may be further embodiments of, or similarly configured as, controller 414, with timer 422, switch 404, and voltage measurer 412 of FIG. 4 described above, and therefore, basic description of these components is not provided again here.

The time taken to reach the maximum voltage of capacitor 802 is defined by the equation:

$$Vc = Vs(1 - e^{-(-t/RC)}),\qquad \text{(Eq. 1)}$$

where Vc is the voltage across capacitor 802, Vs is source 806 voltage, t is the elapsed charge time since the application of the supply voltage from source 806, and RC is a time constant based on the resistance value R of resistive element 804 and the capacitance of capacitor 402. Time t may be determined based on a timer 816 which may be configured to start timing when switch 808 is closed by controller 814.

The relationship above in Equation 1 may be simplified to:

$$\ln(1-(Vc/Vs)) = -t/RC.\qquad \text{(Eq. 2)}$$

As an example, if Vc=0.5Vs, then ln(1−0.5)=−t/RC, or t=0.693 RC. This implies that it takes 0.693RC to reach 50% of the charging voltage of capacitor 802.

Figure 9:
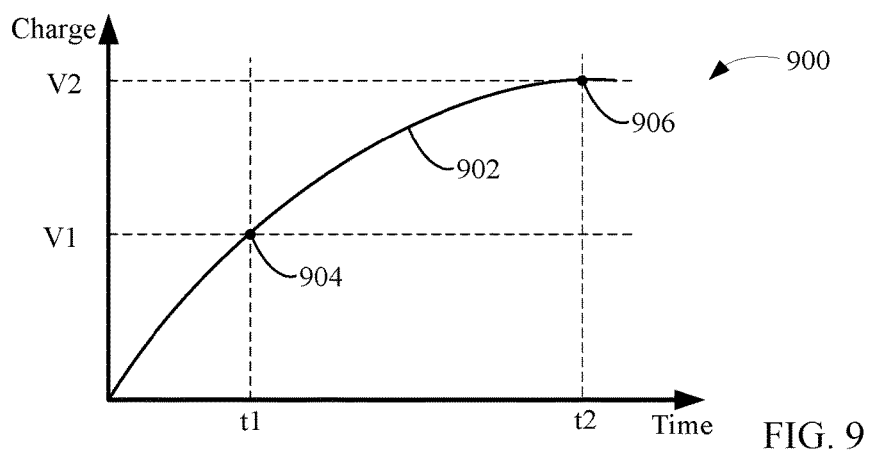
FIG. 9 shows graph for capacitive charge times, according to an example embodiment.

Referring also to FIG. 9, a timing graph 900 for capacitor charging is shown, according to an embodiment. Timing graph 900 shows capacitor voltage 902 in volts (V) during charging (y-axis) with respect to time (t) (x-axis). At point 906, corresponding to time t2 and voltage V2, a capacitor, e.g., capacitor 802, is fully charged. V2 and t2 may respectively correspond to voltage Vc and time t of Equations 1 and 2 above for a full capacitive charge. At point 904, corresponding to time t1 and voltage V1, the capacitor, e.g., capacitor 802, is 50% charged. Again, V1 and t1 may respectively correspond to voltage Vc and time t of Equations 1 and 2 above for a 50% capacitive charge. That is, any amount or percentage of charge of a capacitor, and its corresponding time of charge, as shown by capacitor voltage 902, is contemplated herein for use in the described embodiments.

Continuing with the examples describe above with respect to FIGS. 8 and 9 in view of Equations 1 and 2 above, if the charging time (t) taken to reach 50% of the applied voltage Vs is known based on the capacitor size and type, then the capacitance value of the capacitor is:

$$C = t/0.693R.\qquad \text{(Eq. 3)}$$

In this way, the effective capacitance of the line is calculated.

Figure 10:
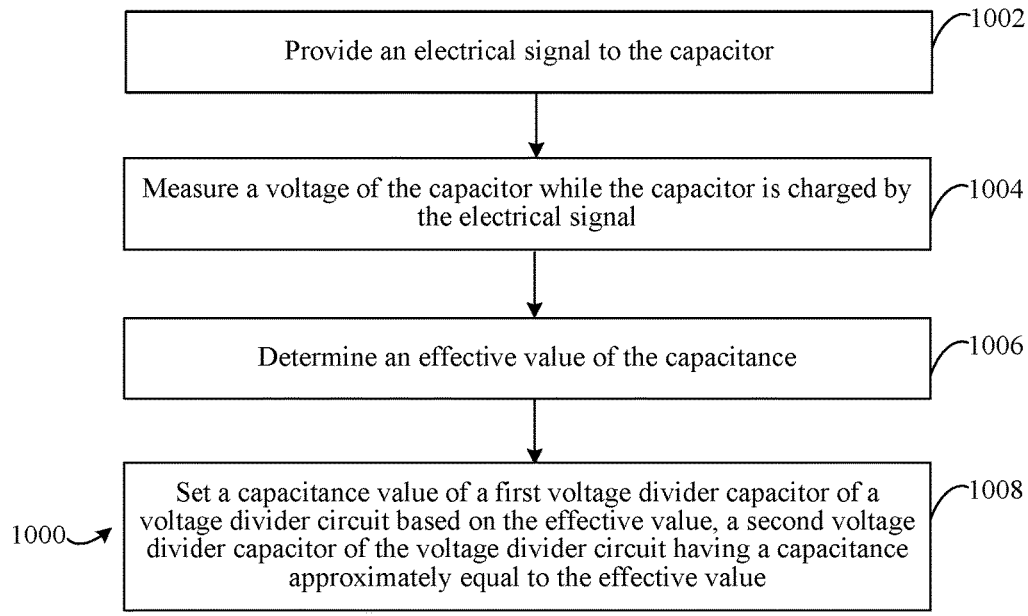
FIG. 10 shows a flowchart for tuning a first capacitor and determining an effective capacitance, according to example embodiments.

Also referring to FIG. 10, a flowchart 1000 for tuning a first capacitor and determining an effective capacitance is shown, according to an embodiment. Embodiments described herein may be configured to perform source device detection according to flowchart 1000. For instance, system 200 of FIG. 2, system 300 of FIG. 3, presence circuit 400, and circuit 800 of FIG. 8, along with any respective components/subcomponents thereof, may be configured to perform source device detection according to flowchart 1000. Flowchart 1000 is described as follows.

An electrical signal is provided to the capacitor (1002). For example controller 814 is configured to provide a control signal to switch 808 to place switch 808 in a closed configuration. An electrical signal is then provided from source 806 to capacitor 804 through resistive element 804. Capacitor 804 begins to charge based on the provided electrical signal. Timer 816 may be configured to start timing when switch 808 is closed by controller 814.

A voltage of the capacitor is measured while the capacitor is charged by the electrical signal (1004). In embodiments, when charging commences for capacitor 802 as in (1002) above, voltage measurer 812 is configured to measure or sense the voltage of capacitor 802 as it charges. In some embodiments, voltage measurer 812 is configured to measure or sense the voltage of capacitor 802 as it charges at specific instances based on timing values of timer 816. Voltage measurer 812 is also configured to provide the measured/sensed voltage values to controller 814.

Figure 11:
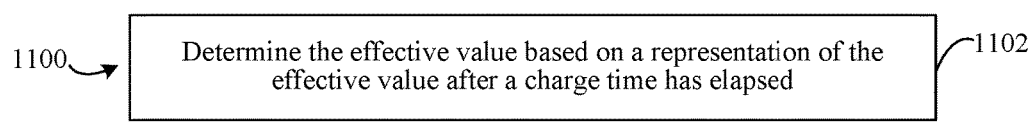
FIG. 11 shows a flowchart for tuning a first capacitor and determining an effective capacitance, according to example embodiments.

An effective value of the capacitance is determined (1006). Controller 814 is configured to determine the effective capacitance value of capacitor 802. Also referring to FIG. 11, a flowchart 1100 for tuning a first capacitor and determining an effective capacitance is shown, according to an embodiment. Embodiments described herein may be configured to perform source device detection according to flowchart 1100. For instance, system 300 of FIG. 3, presence circuit 400, and circuit 800 of FIG. 8, along with any respective components/subcomponents thereof, may be configured to perform source device detection according to flowchart 1100. Flowchart 1100 may be a further embodiment of one or more operations of flowchart 1000 of FIG. 10, such as (1006). Flowchart 1100 is described as follows.

The effective value is determined based on a representation of the effective value after a charge time has elapsed (1102). Controller 814 is also configured to determine the effective capacitance value of capacitor 802 based on the measured/sensed voltage values provided from voltage measurer 812 and the corresponding time from timer 816 at which the voltage value was measured/sensed, in embodiments. For instance, controller 814 may use this information, along with other known values associated with circuit 800, e.g., the resistance value R and the source voltage Vs, to determine the effective capacitance according to Equations 1, 2, and 3 above.

Referring again to flowchart 1000, a capacitance value of a first voltage divider capacitor of a voltage divider circuit is set based on the effective value, a second voltage divider capacitor of the voltage divider circuit having a capacitance approximately equal to the effective value (1008). Setting the capacitance value of the first voltage divider capacitor of the voltage divider circuit may include design and manufacture aspects of HDMI switch/sink production, i.e., to determine capacitance values and build products accordingly, or may include dynamic tuning for HDMI switches/sinks during their operation. For example, capacitor 802 may represent, or may be, a capacitive element(s) representing the effective capacitance of connections in a system or circuit (e.g., system 200 of FIG. 2, system 300 of FIG. 3, and/or presence circuit 400 of FIG. 4) such as, but not limited to Ceff 416 of FIG. 4. An HDMI switch/sink device may be configured as described herein to dynamically tune a capacitor of a presence circuit (e.g., C1 402 of presence circuit 400 in FIG. 4) for implementation of a voltage divider according to the effective capacitance value that is determined. In embodiments, with respect to C1 402 of presence circuit 400 in FIG. 4 and circuit 800 of FIG. 8 as an illustrative, non-limiting example, a capacitor of a presence circuit that comprises the top portion of a voltage divider may be embodied as a capacitor bank, such as alternate C1 402a of FIG. 4. Any number of capacitors of such a capacitor bank, e.g., 424a, 424b, . . . , 424n, may be enabled for use to achieve an overall capacitive value for the voltage divider according to an activation signal on connector 420 from controller 410, or controller 814, in embodiments.

Figure 12:
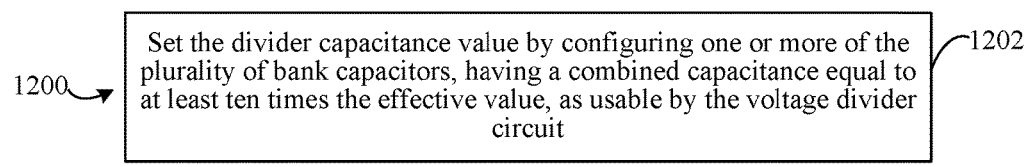
FIG. 12 shows a flowchart for tuning a first capacitor and determining an effective capacitance, according to example embodiments.

Also referring to FIG. 12, a flowchart 1200 for tuning a first capacitor and determining an effective capacitance is shown, according to an embodiment. Embodiments described herein may be configured to perform source device detection according to flowchart 1200. For instance, system 200 of FIG. 2, system 300 of FIG. 3, presence circuit 400, and circuit 800 of FIG. 8, along with any respective components/subcomponents thereof, may be configured to perform source device detection according to flowchart 1200. Flowchart 1200 may be a further embodiment of one or more operations of flowchart 1000 of FIG. 10, such as (1008). Flowchart 1200 is described as follows.

The divider capacitance value is set by configuring one or more of the plurality of bank capacitors, having a combined capacitance equal to at least ten times the effective value, as usable by the voltage divider circuit (1202). For instance, an activation signal on connector 420 from controller 410, or controller 814, in embodiments, causes a specified number of capacitors of alternate C1 204a to be enabled for use to achieve an equivalent capacitance value approximately equal to 10 times the effective capacitance value determined for capacitor 802, although other equivalent capacitance values are also contemplated herein.

To improve the algorithm noted above in this Section, determined capacitive values can be verified for different charging voltages to re-verify the effective capacitance calculated. According to embodiments, this determination may be conducted to calculate an effective capacitance of a system, such as system 200 of FIG. 2 and/or system 300 of FIG. 3, to confirm or set the capacitances for the top voltage divider capacitors in presence circuits, e.g., C1 322 of presence circuit 332 in FIG. 3 or C1 402 (or alternate C1 402a) of presence circuit 400 in FIG. 4, for the source detection techniques and embodiments as noted herein. In embodiments, the value of these capacitors (C1 322 and/or C1 402) may be 10 times the effective capacitance of the system, although other values are contemplated. Appropriate capacitor banks can be designed or utilized based on experimentation and capacitors can be fine-tuned for the desired values.

Additionally, other equivalents may be used in embodiments such as, but not limited to, an AC current source or other voltage source in place of voltage source 806 as shown, different components for net resistivity values may be used, and the placement of switch 808 may be varied with respect to the components of circuit 800.

The tunable techniques and embodiments described herein may be implemented in ways to account for variations in capacitance during operation for HDMI source devices, HDMI sink devices, and HDMI cables, dynamically and/or at the time of device connection.

V. Example Isolation Circuit Embodiments

Systems, devices, and circuits for HDMI source detection, such as circuits in an HDMI switch like presence circuits, along with their respective components, may be configured in various ways to determine HDMI source device presence states, including utilizing circuit isolation, according to embodiments. In some implementations of the described techniques and embodiments, such as during operation of HDMI devices, improvements in operational performance and consistency are provided using circuit isolation for temperature variances.

One problem with changes in temperature is associated with the capacitance of voltage and current sources, such as clock sources (e.g., AC voltage sources), and/or the like, as described herein. Changes in capacitance results in frequency drift for these sources and in increases of power supply current for the sources. Cable detect schemes in accordance with HDMI such as the disclosed embodiments, are tolerable for large amounts of drift in frequency, yet this tolerance is not limitless. Additionally, as temperature increases in a system, problems arise due to demand for current. As an example, a 555 based clock source requires higher amounts of current as its associated temperature increases. When systems and circuits as described herein are unable to deliver higher amounts of current due to the temperature increase, the output voltage of sources such as reference clocks drops (e.g., according to the voltage-to-current relationship) which results in false cable detect scenarios and/or false presence state detection.

According to embodiments, the increase in demand of current noted above is compensated for by using isolation circuits comprising one or more transistors in configurations to isolate sources such as voltage and current sources without impacting the operation and performance of other systems and circuits described herein. The example isolation circuits described below may comprise single transistor or Darlington pair transistor configurations to isolate sources from the systems and/or circuits described herein. It should be noted that while the described isolation circuits include transistors, other equivalent circuit elements are also contemplated herein, as would be understood by one of skill in the relevant art(s) having the benefit of this disclosure.

Figure 13:
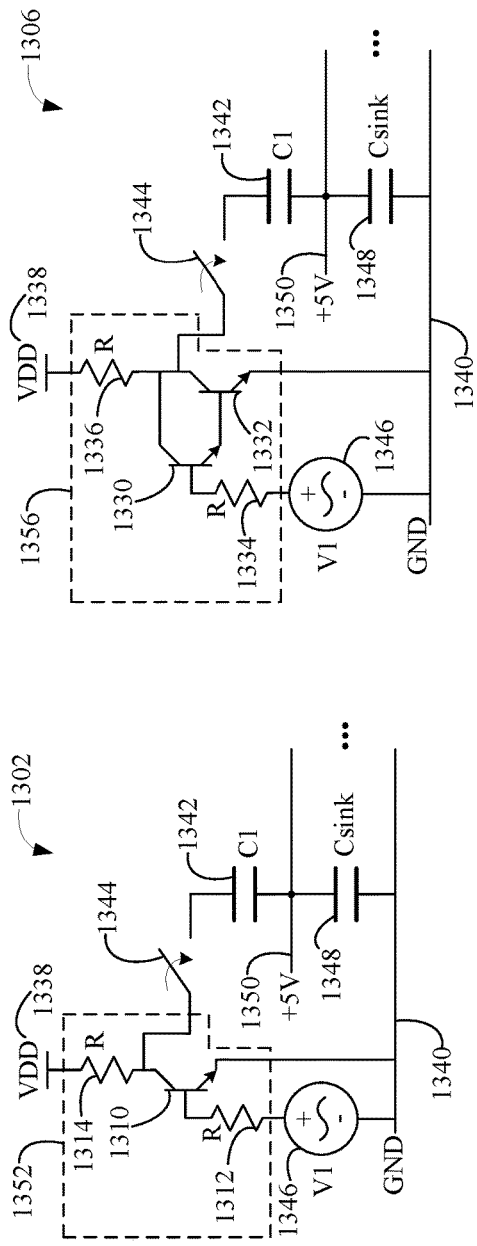
FIG. 13 shows circuit diagrams of isolation circuits for isolating voltage sources for temperature and capacitance variations, according to example embodiments.
Figure 13:
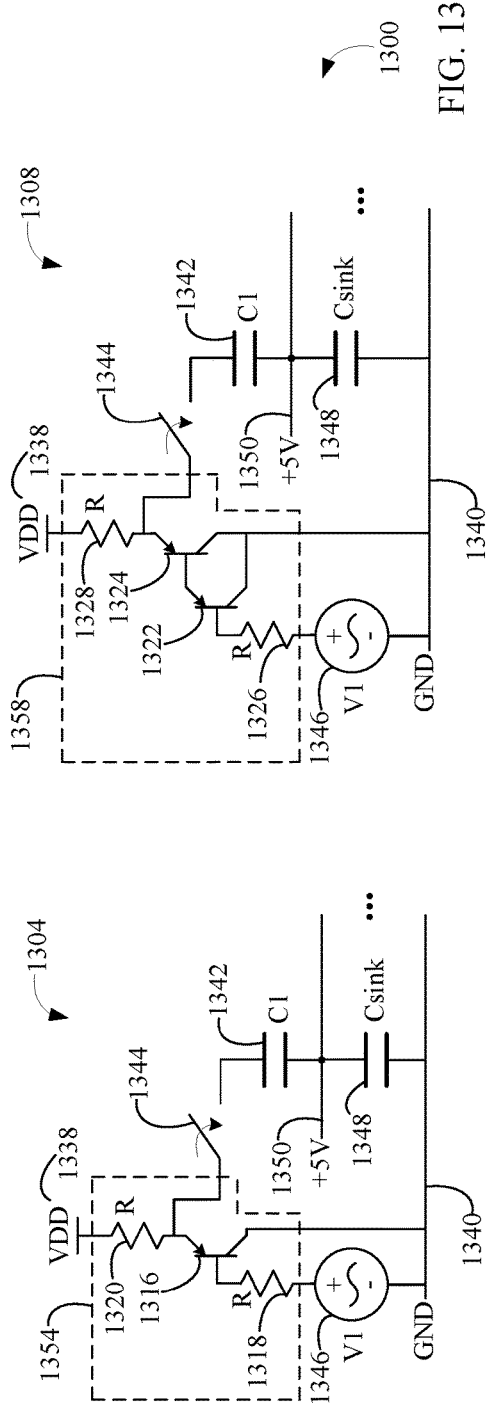

For example, FIG. 13 shows circuit diagrams of isolation circuits for isolating voltage sources for temperature and capacitance variations, according to embodiments. According to embodiments, transistors and transistor pairs isolate the source and provides a consistent source voltage at a wide range of temperatures for systems and circuits described herein. As illustrated, the transistors of FIG. 13 are Bipolar Junction Transistors (BJTs), although other equivalent transistors and/or elements are contemplated herein. A circuit 1302 and a circuit 1304, each with single transistor configurations for isolation, and a circuit 1306 and a circuit 1308, each with Darlington pair configurations for isolation, are illustrated in FIG. 13. The isolation circuits of FIG. 13 may be implemented in HDMI sink/switch devices, as well as other HDMI and non-HDMI devices.

Circuit 1302, circuit 1304, circuit 1306, and circuit 1308 each include elements common to each other that may be further embodiments of portions of HDMI sink device 302 of FIG. 3 and/or of presence circuit 400 of FIG. 4. That is, circuit 1302, circuit 1304, circuit 1306, and circuit 1308 each include a capacitor C1 1342, a switch 1344, a source 1346, a capacitor Csink 1348, a GND 1340, a +5V line 1350, which may respectively correspond to C1 322 of FIG. 3 and/or C1 402 of FIG. 4, switch 324 of FIG. 3 and/or switch 404 of FIG. 4, current source 326 of FIG. 3 and/or current source 406 of FIG. 4, Csink 310 of FIG. 3 and/or Ceff 416 of FIG. 4, GND 308 of FIG. 3 and/or GND 412 of FIGS. 4, and +5V line 320 of FIG. 3 and/or +5V line 414 of FIG. 4, according to embodiments. It should be noted that voltage and current sources may be implemented interchangeably according to configurations and embodiments as described herein, and that only Csink 1348 is shown for illustrative brevity but that other components for an effective capacitance as described herein are contemplated as being present in embodiments.

The described isolation circuits may be implemented with, or in place of, the electrical connections between the outputs of sources (e.g., source 1346) and switches (e.g., switch 1344) as shown. For instance, circuit 1302 also includes an isolation circuit 1352. Isolation circuit 1352 includes an NPN transistor 1310 with its base electrically connected to the output of source 1346 via a resistive element 1312 with a resistance value R. The emitter of transistor 1310 is electrically connected to GND 1340, and the collector of transistor 1310 is electrically connected to switch 1344 and to a system voltage VDD 1338 via a resistive element 1314 having a resistance value R.

Circuit 1304 also includes an isolation circuit 1354. Isolation circuit 1354 includes a PNP transistor 1316 with its base electrically connected to the output of source 1346 via a resistive element 1318 with a resistance value R. The collector of transistor 1316 is electrically connected to GND 1340, and the emitter of transistor 1316 is electrically connected to switch 1344 and to a system voltage VDD 1338 via a resistive element 1320 having a resistance value R.

Circuit 1306 also includes an isolation circuit 1356. Isolation circuit 1356 includes a Darlington pair comprising an NPN transistor 1330 and an NPN transistor 1332. The base of transistor 1330 is electrically connected to the output of source 1346 via a resistive element 1334 with a resistance value R. The emitter of transistor 1332 is electrically connected to GND 1340. The emitter of transistor 1330 is electrically connected to the base of transistor 1332, and the collectors of transistor 1330 and transistor 1332 are electrically connected to switch 1344 and to a system voltage VDD 1338 via a resistive element 1336 having a resistance value R.

Circuit 1308 also includes an isolation circuit 1358. Isolation circuit 1358 includes a Darlington pair comprising a PNP transistor 1322 and a PNP transistor 1324. The base of transistor 1322 is electrically connected to the output of source 1346 via a resistive element 1326 with a resistance value R. The collectors of transistor 1332 transistor 1324 are electrically connected to GND 1340. The emitter of transistor 1322 is electrically connected to the base of transistor 1324, and the emitter of transistor 1324 is electrically connected to switch 1344 and to a system voltage VDD 1338 via a resistive element 1328 having a resistance value R.

Figure 14:
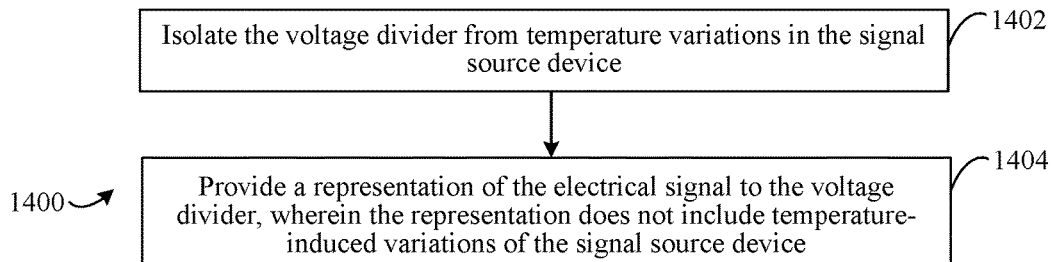
FIG. 14 shows a flowchart for isolating voltage sources using isolation circuits, according to example embodiments.

When the described isolation circuits are activated by source 1346, VDD 1338 provides an electrical signal to switch 1344 and then to C1 1342 if switch 1344 is closed. Referring also to FIG. 14, a flowchart 1400 for isolating sources using isolation circuits is shown, according to an embodiment. Embodiments described herein may be configured to perform source device detection according to flowchart 1400. For instance, system 200 of FIG. 2, system 300 of FIG. 3, presence circuit 400, circuit 800 of FIG. 8, circuit 1302, circuit 1304, circuit 1306, and circuit 1308 of FIG. 13, along with any respective components/subcomponents thereof, may be configured to perform source device detection according to flowchart 1400. Flowchart 1400 is described as follows.

Isolate the voltage divider from temperature variations in the signal source device (1402). For instance, isolation circuit 1352, isolation circuit 1354, isolation circuit 1356, and isolation circuit 1358 are each configured to isolate the voltage dividers described herein (e.g., C1 322 and Csink 310 in FIG. 3 and/or C1 402 and Ceff 416 of FIG. 4) using transistors to prevent direct electrical connections and interactions with sources of current/voltage that provide electrical signals to the current dividers. Accordingly, variations in the output of source 1346 do not affect the voltage dividers because an electrical signal from VDD 1338 is provided thereto.

Provide a representation of the electrical signal to the voltage divider, wherein the representation does not include temperature-induced variations of the signal source device (1404). For example, as noted above, when the described isolation circuits are activated by source 1346, VDD 1338 provides an electrical signal to switch 1344 via a connected resistive element of circuit 1302, circuit 1304, circuit 1306, and circuit 1308 and then to C1 1342 when switch 1344 is closed. That is, the electrical signal from VDD 1338 is a representation or proxy of the output of source 1346 that is provided, according to the transistor configurations of circuit 1302, circuit 1304, circuit 1306, and circuit 1308, based on the transistors being driven by the electrical signal output of source 1346.

VDD 1338 may be any system or device voltage such as, but not limited to, an operating voltage. VDD 1338 may have a voltage value of approximately 3V-5V in some embodiments. Resistance values R for resistive elements described above may be the same or different, according to embodiments. Resistance values R may be determined based on specific circuit implementations according to the value(s)

of VDD 1338, transistor (or equivalent element) type, source characteristics such as voltage, and/or the like.

VI. Further Example Embodiments and Advantages

As noted above, systems and devices may be configured in various ways to detect source devices for HDMI configurations, according to the techniques and embodiments provided. For example, embodiments and techniques, including methods, described herein may be performed in various ways such as, but not limited to, being implemented by hardware, or hardware combined with one or both of software and firmware. For example, embodiments may be implemented as systems and devices, such as HDMI systems, schemes, setups, and devices, specifically customized hardware, ASICs, FPGAs, mixed-signal circuits, logic and circuits on a printed circuit board (PCB) (e.g., with discrete components) or a on semiconductor substrate, other electrical circuitry, and/or the like.

In embodiments, a controller, such as controller 410 of FIG. 4 and/or controller 814 of FIG. 8, is configured to provide information regarding effective capacitance values to a memory or storage device of an HDMI switch and/or an HDMI sink for subsequent use in operations thereof. Such operation may include comparing subsequently detected effective capacitance values, when the HDMI source device is later connected, for refining the techniques and embodiments described herein. For instance, after an effective capacitance value and a presence state are determined, an HDMI switch and/or an HDMI sink may identify a connected HDMI source device that matches stored effective capacitance information for comparison of values.

Presence circuits such as presence circuit 400 and other circuits such as circuit 800 described herein may be combined in embodiments. In such combinations, common components may be shared, and circuit-specific components may be isolated from each other for individual operations of the described circuits using the described switches and/or additional switches not shown. It is also contemplated that multiple instances of the circuits described herein may be included in systems and devices, e.g., one instance for each port of a system or device).

Embodiments also provide for tuning capabilities to account for temperature variations. As the temperature of a board such as a PCB of a system or device increases due to internal/external factors, the capacitance of a capacitor such as C1 322 of FIG. 3 and/or C1 402 of FIG. 4 may be reduced. The amount of capacitance reduced depends upon many factors such as dielectric material, temperature coefficient, etc. Referring again to FIG. 4, for example, reduction in capacitance may change the ratio of C1 402 to Ceff 416 which in turn reduces the reference voltage of the circuit, and this may trigger a false cable connect scenario. Additionally, capacitors with NPO dielectrics may be used, according to embodiments. Capacitors with NPO dielectrics have very stable capacitance over a wide range of operating temperatures. This ensures that the ratio of C1 402 to Ceff 416 is more constant over wide temperature ranges, and hence reference voltage is not affected or is negligibly affected. In other words, in embodiments, an NPO capacitor may be used to stabilize the voltage divider portion of the circuits described herein.

In embodiments, one or more of the operations of any flowchart described herein may not be performed. Moreover, operations in addition to or in lieu of any flowchart described herein may be performed. Further, in embodiments, one or more operations of any flowchart described herein may be performed out of order, in an alternate sequence, or partially (or completely) concurrently with each other or with other operations.

A "switch" as described herein with respect to circuits may be a standard switch, e.g., a single-pole, single-throw switch, etc., a field effect transistor (FET) or other type of transistor, a multiplexor, combinatorial logic, and/or other equivalent components configured to selectively provide signals in a circuit.

A "connector," as used herein, may refer to a hardware connection such as an electrically conductive element or a software connection for the transfer of data, instructions, and/or information, according to embodiments.

The further example embodiments and advantages described in this Section may be applicable to embodiments disclosed in any other Section of this disclosure.

In an embodiment, a method is described. The method includes providing a voltage divider circuit across a voltage associated with an HDMI port, and supplying a first voltage to the voltage divider. The method also includes measuring a second voltage of the voltage divider based on the first supplied voltage, and determining a presence state of an HDMI source device based at least on the second voltage that is measured.

In an embodiment of the method, the first voltage is approximately 0V, the measured second voltage is greater than, or greater than or equal to, approximately 4V, and the presence state is indicative of an HDMI source device being present and being powered on.

In an embodiment, the method includes supplying a third voltage to the voltage divider, measuring a fourth voltage of the voltage divider based on the second supplied voltage, and determining the presence state based at least on the fourth voltage that is measured. In some of the embodiments, the third voltage is between approximately 3V and 5V, the measured fourth voltage is less than, or less than or equal to, approximately 0.5V, and the presence state is indicative of an HDMI source device being present. In some others of the embodiments, the third voltage is between approximately 3V and 5V, the measured fourth voltage is greater than, or greater than or equal to, approximately 4V, and the presence state is indicative of an HDMI source device not being present.

In an embodiment of the method, the third voltage is supplied by one of a current source or a voltage source via a circuit switch that is electrically coupled between a current divider and the current source, and is configured to be closed to provide an electrically conductive path to supply the third voltage.

In an embodiment of the method, the voltage divider circuit comprises a first capacitor and a second capacitor, the second capacitor is configured to have an effective capacitance approximately equal to combined capacitances of an HDMI sink device comprising the voltage divider circuit, the HDMI source device, and an HDMI connector therebetween, and the first capacitor has a pre-configured capacitance equal to at least approximately ten times the effective capacitance.

In an embodiment of the method, the voltage divider circuit comprises a first capacitor and a second capacitor, the second capacitor is configured to have an effective capacitance approximately equal to the combined capacitances of an HDMI sink device comprising the voltage divider circuit, the HDMI source device, and an HDMI connector therebetween, and the first capacitor is configured to be dynamically tunable to have a capacitance equal to at least approximately ten times the effective capacitance.

In another embodiment, a system is described. The system includes an input port having an associated conductive element, the input port being configured to receive an HDMI connector for an HDMI source device, and a voltage divider circuit across the associated conductive element. The system also includes a signal source device configured to provide an electrical signal to the voltage divider circuit. The system further includes a voltage measurer configured to measure voltages of the voltage divider, and a determination component configured to determine a presence state of HDMI source devices based on the voltage of the voltage divider.

In an embodiment of the system, the signal source device is one of a current source, a digital to analog converter, a clock source, or a voltage source, and the voltage divider comprises a first capacitor, and a second capacitor that has an effective capacitance approximately equal to combined capacitances of an HDMI sink device comprising the voltage divider circuit, the HDMI source device, and the HDMI connector therebetween.

In the embodiment, one or more of the first capacitor and the second capacitor comprise a negative-positive zero (NPO) dielectric.

In an embodiment, the system further includes a circuit switch electrically coupled between the signal source device and the voltage divider, the circuit switch being configured to open and close based on an activation signal from the determination component, and to allow the voltage measurer to measure at least two different voltages of the voltage divider that are based on the electrical signal and on the absence of the electrical signal.

In the embodiment of the system, the determination component is configured to determine the presence state as being indicative of an HDMI source device being present and being powered on based on a voltage value measured by the voltage measurer when the circuit switch is open.

In another of the embodiment of the system, the determination component is configured to determine the presence state as being indicative of an HDMI source device being present based on a voltage value measured by the voltage measurer when the circuit switch is closed.

In another of the embodiment of the system, the determination component is configured to determine the presence state as being indicative of an HDMI source device not being present based on a voltage value measured by the voltage measurer when the circuit switch is closed.

In an embodiment, the system further includes an isolation circuit configured to isolate the voltage divider from temperature variations in the signal source device, and to provide a representation of the electrical signal to the voltage divider, wherein the representation does not include temperature-induced variations of the signal source device.

In an embodiment, the system is one of an HDMI switch that is configured to operate as an HDMI sink, or a television.

Another system is also described. The system includes a resistor-capacitor (RC) circuit that includes a resistor with a resistance and a capacitor with a capacitance approximately equal to combined capacitances of an HDMI sink device comprising the RC circuit, an HDMI source device, and an HDMI connector therebetween. The system also includes a signal source device configured to provide an electrical signal to the capacitor, and a voltage measurer configured to measure a voltage of the capacitor while the capacitor is charged by the electrical signal. The system further includes a determination component configured to determine an effective value of the capacitance, and to set a divider capacitance value of a first voltage divider capacitor of a voltage divider circuit based on the effective value, a second voltage divider capacitor of the voltage divider circuit having a capacitance approximately equal to the effective value.

In an embodiment of the system, the voltage divider capacitor comprises a capacitor bank that includes a plurality of bank capacitors, and the determination component is configured to set the divider capacitance value by configuring one or more of the plurality of bank capacitors, having a combined capacitance equal to at least ten times the effective value, as usable by the voltage divider circuit.

In an embodiment of the system, the determination component is configured to determine the effective value based on a representation of the effective value after a charge time has elapsed.

VII. Example Computer Implementations

Various features of the circuits, devices, and systems described herein, including but without limitation, system 200 of FIG. 2, system 300 of FIG. 3, presence circuit 400 of FIG. 4, circuit 800 of FIG. 8, and circuits 1302, 1304, 1306, and 1308 of FIG. 13, along with various features of any respective components/subcomponents thereof, and/or any techniques, flowcharts, further systems, sub-systems, and/or components disclosed and contemplated herein may be implemented in hardware (e.g., hardware logic/electrical circuitry), or any combination of hardware with one or both of software (computer program code or instructions configured to be executed in one or more processors or processing devices) and firmware.

Figure 15:
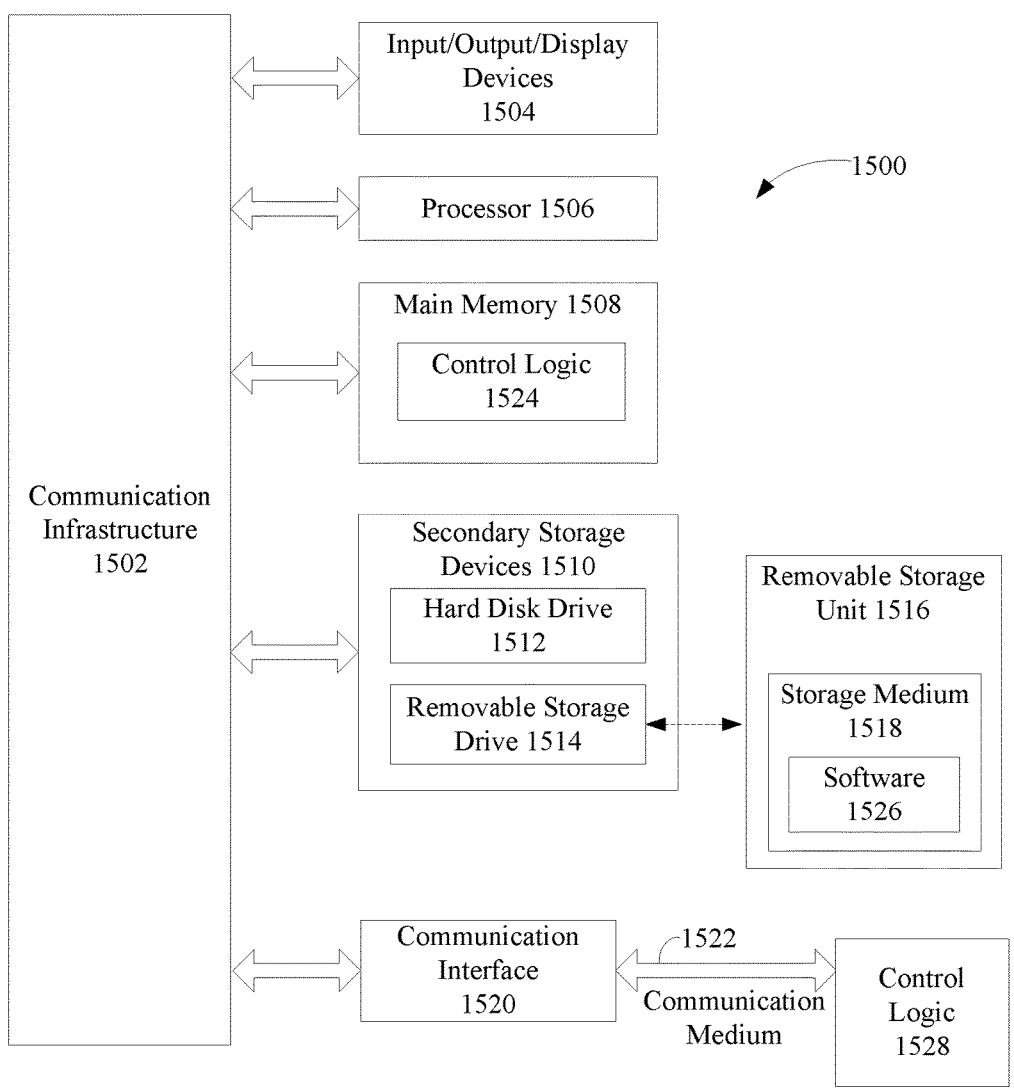
FIG. 15 shows a block diagram of a computing device/system in which the techniques disclosed herein may be performed and the embodiments herein may be utilized.

The embodiments described herein, including HDMI-enabled electronics, circuitry, devices, systems, methods/processes, and/or apparatuses, may be implemented in or using well known processing devices, communication systems, servers, and/or, computers, such as a processing device 1500 shown in FIG. 15. It should be noted that processing device 1500 may represent communication devices/systems, entertainment systems/devices, HDMI-enabled devices, processing devices, as well as tablets, laptops and/or traditional computers in one or more embodiments. For example, source device detection systems and devices according to the described techniques and embodiments, and any of the sub-systems and/or components respectively contained therein and/or associated therewith, may be implemented in or using one or more processing devices 1500 and similar computing devices.

Processing device 1500 can be any commercially available and well known communication device, processing device, and/or computer capable of performing the functions described herein, such as, but not limited to, devices/computers available from International Business Machines®, Apple®, Sun®, HP®, Dell®, Cray®, Samsung®, Nokia®, etc. Processing device 1500 may be any type of computer, including a desktop computer, a server, etc., and may be a computing device or system within another device or system.

Processing device 1500 includes one or more processors (also called central processing units, or CPUs), such as a processor 1506. Processor 1506 is connected to a communication infrastructure 1502, such as a communication bus. In some embodiments, processor 1506 can simultaneously operate multiple computing threads, and in some embodiments, processor 1506 may comprise one or more processors.

Processing device 1500 also includes a primary or main memory 1508, such as random access memory (RAM). Main memory 1508 has stored therein control logic 1524 (computer software), and data.

Processing device 1500 also includes one or more secondary storage devices 1510. Secondary storage devices 1510 include, for example, a hard disk drive 1512 and/or a removable storage device or drive 1514, as well as other types of storage devices, such as memory cards and memory sticks. For instance, processing device 1500 may include an industry standard interface, such as a USB interface for interfacing with devices such as a memory stick. Removable storage drive 1514 represents a floppy disk drive, a magnetic tape drive, a compact disk drive, an optical storage device, tape backup, etc.

Removable storage drive 1514 may interact with a removable storage unit 1516. Removable storage unit 1516 includes a computer useable or readable storage medium 1518 having stored therein computer software 1526 (control logic) and/or data. Removable storage unit 1516 represents a floppy disk, magnetic tape, compact disk, DVD, optical storage disk, or any other computer data storage device. Removable storage drive 1514 reads from and/or writes to removable storage unit 1516 in a well-known manner.

Processing device 1500 also includes input/output/display devices 1504, such as touchscreens, LED and LCD displays, monitors, keyboards, pointing devices, etc.

Processing device 1500 further includes a communication or network interface 1520. Communication interface 1520 enables processing device 1500 to communicate with remote devices. For example, communication interface 1520 allows processing device 1500 to communicate over communication networks or mediums 1522 (representing a form of a computer useable or readable medium), such as LANs, WANs, the Internet, etc. Communication interface 1520 may interface with remote sites or networks via wired or wireless connections.

Control logic 1528 may be transmitted to and from processing device 1500 via the communication medium 1522.

Any apparatus or manufacture comprising a computer useable or readable medium having control logic (software) stored therein is referred to herein as a computer program product or program storage device. This includes, but is not limited to, processing device 1500, main memory 1508, secondary storage devices 1510, and removable storage unit 1516. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media, software programs, and transitory signals (do not include communication media, software programs, or transitory signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 15) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 1506 of FIG. 15), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VIII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method comprising:
providing a voltage divider circuit across a conductor associated with a +5V connector of an HDMI port;
supplying a first voltage to the voltage divider circuit that is across the conductor;
measuring a second voltage of the voltage divider circuit at the conductor based on the first voltage;
supplying a third voltage to the voltage divider circuit;
measuring a fourth voltage of the voltage divider circuit based on the third voltage; and
determining a presence state of an HDMI source device based at least on the second voltage that is measured and based at least on the fourth voltage that is measured;
wherein the third voltage is between approximately 3V and 5V, the measured fourth voltage is less than, or less than or equal to, approximately 0.5V, and the presence state is indicative of an HDMI source device being present, or wherein the third voltage is between approximately 3V and 5V, the measured fourth voltage is greater than, or greater than or equal to, approximately 4V, and the presence state is indicative of an HDMI source device not being present.

2. The method of claim 1, wherein the third voltage is supplied by one of a current source or a voltage source via a circuit switch that is electrically coupled between a current divider and the current source, and is configured to be closed to provide an electrically conductive path to supply the third voltage.

3. The method of claim 1, wherein the method is performed in one of an HDMI switch that is configured to operate as an HDMI sink, or a television.

4. The method of claim 1, wherein the voltage divider circuit includes a tunable portion configured to adjust a ratio of the voltage divider circuit.

5. A system comprising:
an input port having an associated conductive element, the input port being configured to receive a +5V HDMI connector for an HDMI source device;
a voltage divider circuit across the associated conductive element;
a signal source device configured to provide an electrical signal to the voltage divider circuit that is across the associated conductive element;
a voltage measurer configured to measure voltages of the voltage divider circuit at the associated conductive element;
a determination component configured to determine a presence state of HDMI source devices based on the voltage of the voltage divider circuit; and
a circuit switch electrically coupled between the signal source device and the voltage divider circuit, the circuit switch being configured to:
open and close based on an activation signal from the determination component; and
allow the voltage measurer to measure at least two different voltages of the voltage divider circuit that are based on the electrical signal and on the absence of the electrical signal;
the determination component also configured to:
determine the presence state as being indicative of an HDMI source device being present and being powered on based on a voltage value measured by the voltage measurer when the circuit switch is open.

6. The system of claim 5, wherein the signal source device is one of a current source, a digital to analog converter, a clock source, or a voltage source.

7. The system of claim 5, wherein the voltage divider circuit includes a tunable portion configured to adjust a ratio of the voltage divider circuit.

8. The system of claim 5, wherein the determination component is configured to:
determine the presence state as being indicative of an HDMI source device being present based on a voltage value measured by the voltage measurer when the circuit switch is closed.

9. The system of claim 5, wherein the determination component is configured to:
determine the presence state as being indicative of an HDMI source device not being present based on a voltage value measured by the voltage measurer when the circuit switch is closed.

10. The system of claim 5, further comprising an isolation circuit configured to:
isolate the voltage divider circuit from temperature variations in the signal source device; and
provide a representation of the electrical signal to the voltage divider circuit, wherein the representation does not include temperature-induced variations of the signal source device.

11. The system of claim 5, wherein the system is one of an HDMI switch that is configured to operate as an HDMI sink, or a television.

12. A system comprising:
a voltage divider circuit across a conductor of a +5V connector of an HDMI port; and
a determination component configured to:
determine a presence state from a plurality of presence states for HDMI source devices associated with the system based on a measured divided voltage of the voltage divider circuit at the conductor, including being configured to:
determine the presence state as indicative of an HDMI source device being present based on the measured divided voltage being less than, or less than or equal to, approximately 0.5V for a voltage between approximately 3V and 5V being supplied to the voltage divider circuit; and
determine the presence state as indicative of an HDMI source device not being present based on the measured divided voltage being greater than, or greater than or equal to, approximately 4V for the voltage between approximately 3V and 5V being supplied to the voltage divider circuit.

13. The system of claim 12, wherein a voltage of approximately 0V is supplied to the voltage divider circuit, and
wherein the determination component is configured to:
determine the presence state as indicative of an HDMI source device being present and being powered on based on the measured divided voltage being greater than, or greater than or equal to, approximately 4V.

14. The system of claim 12, further comprising at least one of a current source, a digital to analog converter, a clock source, or a voltage source configured to supply the voltage between approximately 3V and 5V being supplied to the voltage divider circuit.

* * * * *